United States Patent

Shinozuka et al.

Patent Number: 5,298,305
Date of Patent: Mar. 29, 1994

[54] PHASE-CHANGE TYPE INFORMATION RECORDING MEDIUM

[75] Inventors: Michiaki Shinozuka, Yokohama; Makoto Harigaya, Hiratsuka; Yukio Ide, Mishima; Yoshiyuki Kageyama, Yokohama; Hiroko Iwasaki, Tokyo, all of Japan

[73] Assignee: Ricoh Company, Ltd., Tokyo, Japan

[21] Appl. No.: 998,398

[22] Filed: Dec. 29, 1992

[30] Foreign Application Priority Data

Jan. 8, 1992 [JP] Japan .................................. 4-001488

[51] Int. Cl.$^5$ .................................. B32B 3/00
[52] U.S. Cl. .......................... 428/64; 428/65; 428/457; 428/913; 430/945; 346/76 L; 346/135.1
[58] Field of Search .................. 428/64, 65, 457, 913; 430/945; 246/76 L, 135.1

[56] References Cited

U.S. PATENT DOCUMENTS

| | | | |
|---|---|---|---|
| 5,011,723 | 4/1991 | Harigaya et al. | 428/64 |
| 5,013,593 | 5/1991 | Matsuzawa et al. | 428/64 |
| 5,102,708 | 4/1992 | Matsubara et al. | 428/64 |
| 5,171,618 | 12/1992 | Suzuki et al. | 428/64 |
| 5,244,706 | 9/1993 | Hirata et al. | 428/64 |

Primary Examiner—Patrick J. Ryan
Assistant Examiner—Elizabeth Evans
Attorney, Agent, or Firm—Cooper & Dunham

[57] ABSTRACT

A phase-change type information recording medium composed of a substrate and a recording layer formed on the substrate, which recording layer is composed of a recording material with the composition thereof in terms of atomic percentage being represented by general formula:

$$Ag_\alpha In_\beta Te_\gamma Sb_\delta + M_x$$

$0.5 \leq x \leq 10$, $\alpha + \beta + \gamma + \delta + x = 100$, and M is one wherein $5 \leq \alpha \leq 17$, $6 \leq \beta \leq 18$, $13 \leq \gamma \leq 36$, $33 \leq \delta \leq 77$, additional element selected from the group consisting of B, N, C, P and Si.

7 Claims, 2 Drawing Sheets

PHASE-CHANGE TYPE INFORMATION RECORDING MEDIUM

BACKGROUND OF THE INVENTION

1. Field of the Invention

The present invention relates to an optical recording medium for use in an optical memory apparatus, and more particularly to a phase-change type information recording medium in which a phase change is caused in a recording material of a recording layer by the application of a light beam thereto, thereby performing the recording and reproducing of information, and enabling the overwriting of information.

2. Discussion of Background

A phase-change type optical information recording medium utilizing a phase change between a crystalline phase and an amorphous phase or between one crystalline phase and another crystalline phase is conventionally known as one of the optical memory media which are capable of recording, reproducing and erasing information by the application thereto of electro-magnetic waves, such as a laser beam. This kind of phase-change type optical information recording medium enables the overwriting of information by use of a single laser beam, although such overwriting is difficult to conduct by the application of a single laser beam in magneto-optical memory using a magneto-optical recording medium.

An optical system of a drive unit for the phase-change type optical information recording medium can be designed simpler than that for a magneto-optical recording medium, so that recently research and development of this kind of recording medium has been actively made.

As disclosed in U.S. Pat. No. 3,530,441, the so-called chalcogen-based alloys, such as Ge—Te, Ge—Te—Sb—S, Ge—Te—S, Ge—Se—S, Ge—Se—Sb, Ge—As—Se, In—Te, Se—Te and Se—As, are conventionally used as recording materials for the phase-change type optical information recording medium. In addition, it is proposed to add an element of Au to the above-mentioned Ge—Te based alloy to improve the stability and to increase the rate of crystallization of the recording material as disclosed in Japanese Laid-Open Patent Application 61-219692. Furthermore, the addition of Sn and Au to the Ge—Te based alloy, and the addition of Pd to the same are respectively proposed in Japanese Laid-Open Patent Applications 61-270190 and 62-19490 for the same reasons as mentioned above. Furthermore, in Japanese Laid-Open Patent Application 62-73438, a recording material composed of a Ge—Te—Se—Sb alloy with a specific composition ratio of each component in terms of atomic percentage is proposed for the improvement of the repetition properties of recording and erasing.

However, none of the above-mentioned conventional phase-change type optical information recording media satisfies all the requirements for the phase-change type rewritable optical memory medium.

Japanese Laid-Open Patent Application 63-251290 discloses an optical information recording medium which comprises a recording layer comprising a compound of a multi-component system composed of substantially three or more components in a single crystalline phase. The single crystalline phase of the compound of a multi-component system composed of substantially three or more components is considered to contain a compound with a stoichiometric composition, for example, $In_3SbTe_2$, in the recording layer in an amount of 90 atm.% or more. It is mentioned that by the provision of this kind of recording layer, high-speed recording and high-speed erasing can be performed to some extent. However, this optical information recording medium has the shortcomings that the erasability is low because of insufficient laser power for recording and erasing, so that erasing becomes imperfect.

Furthermore, Japanese Laid-Open Patent Application 1-277338 discloses an optical recording medium which comprises a recording layer comprising an alloy with a composition represented by the formula of $(Sb_aTe_{1-a})_{1-b}M_b$, wherein $0.4 \leq a < 0.7$, and $b \leq 0.2$, and M is one element selected from the group consisting of Ag, Al, As, Au, Bi, Cu, Ga, Ge, In, Pb, Pt, Se, Si, Sn and Zn. The basic system of the aforementioned alloy is $Sb_2Te_3$, and the addition of a large excess of Sb to this composition in terms of atomic percentage enables high-speed erasing operation and improves the repetition properties. The addition of the element M can further enhance the high-speed erasing performance. In addition to the above advantages, this reference asserts that the erasability by the application of DC light is increased. However, this reference does not show any specific erasability attained at the overwriting, and according to the experiments conducted by the inventors of the present invention, the erasability in the course of the overwriting operation is unsatisfactory and the recording sensitivity is insufficient for use in practice.

Japanese Laid-Open Patent Application 60-177446 discloses an optical recording medium which comprises a recording layer comprising an alloy with a composition represented by the formula of $(In_{1-X}Sb_X)_{1-Y}M_Y$, wherein $0.55 \leq X \leq 0.80$, $0 \leq Y \leq 0.20$, and M is one element selected from the group consisting of Au, Ag, Cu, Pd, Pt, Al, Si, Ge, Ga, Sn, Te, Se and Bi. In addition, Japanese Laid-Open Patent Application 63-228433 discloses a recording layer of an optical recording medium, which comprises an alloy with a composition of $GeTe-Sb_2Te_3$—Sb (excess). The sensitivity and erasability required for the recording medium cannot be satisfied in any of the above-mentioned conventional optical recording media.

Under such circumstances, the most important problems to be solved in the conventional optical recording media are to improve the recording sensitivity and erasing sensitivity, to prevent the decrease of the erasability in the course of the overwriting operation, which is caused by the remaining of unerased portions, and to extend the life of the recorded portions and unrecorded portions in the recording media.

A conventional recording material of an alloy AgIn-TeSb enables high-speed recording and attains the improvement of the erasability, but the repetition properties in the course of the overwriting are not sufficient for use in practice.

The above-mentioned drawbacks stem from the segregation and movement of the elements in the recording layer, which are caused by the repetition of recording and erasing operations with the application of a laser beam thereto.

SUMMARY OF THE INVENTION

Accordingly, an object of the present invention is to provide a phase-change type information recording medium with improved repetition properties in the overwriting operation, more specifically, a phase-change type information recording medium with a minimum segregation or movement of the elements in the recording material in the recording layer after the repetition of recording and erasing operations.

The above-mentioned object of the present invention can be achieved by a phase-change type information recording medium comprising a substrate and a recording layer formed thereon, comprising a phase-change type recording material with the composition thereof in terms of atomic percentage (atm.%) being represented by the following general formula:

$$Ag_\alpha In_\beta Te_\gamma Sb_\delta + M_x$$

wherein $5 \leq \alpha \leq 17$, $6 \leq \beta \leq 18$, $13 \leq \gamma \leq 36$, $33 \leq \delta \leq 77$, $0.5 \leq x \leq 10$, $\alpha + \beta + \gamma + \delta + x = 100$, and M is one additional element selected from the group consisting of B, N, C, P and Si. In the above phase-change type recording material, the elements Ag, In, Te and Sb are the main elements which constitute the recording material, and the additional element having a smaller radius than that of any of the main elements locates in the interstices between the larger main elements, so that the recording material constitutes an interstitial compound.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
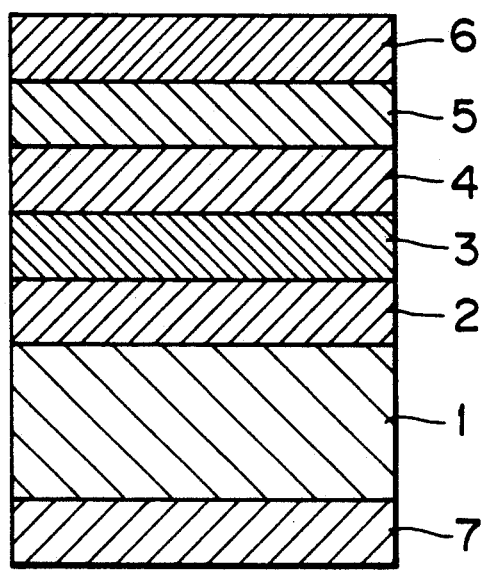
FIG. 1 is a cross-sectional view of an example of a phase-change type information recording medium of the present invention.

FIG. 1 is a schematic cross-sectional view of an example of the phase-change type information recording medium of the present invention. As shown in FIG. 1, the information recording medium of the present invention comprises a substrate 1, a lower protective layer 2, a recording layer 3, an upper protective layer 4, a heat dissipation layer 5, and an organic protective layer 6, which are successively overlaid on the substrate 1. In addition, an antistatic layer 7 is formed on the back side of the substrate 1, opposite to the lower protective layer 2 with respect to the substrate 1.

The structure of the phase-change type information recording medium of the present invention is not limited to the above, and numerous additional modifications and variations of the present invention are possible within the scope of the appended claims.

The recording layer 3 comprises a phase-change type recording material with the composition thereof in terms of atomic percentage being represented by the following general formula:

$$Ag_\alpha In_\beta Te_\gamma Sb_\delta + M_x$$

wherein $5 \leq \alpha \leq 17$, $6 \leq \beta \leq 18$, $13 \leq \gamma \leq 36$, $33 \leq \delta \leq 77$, $0.5 \leq x \leq 10$, $\alpha + \beta + \gamma + \delta + x = 100$ atm.%, and M is an additional element selected from the group consisting of B, N, C, P and Si.

In the above formula, the elements Ag, In, Te and Sb are the main elements of the recording material, and the additional element having a smaller atomic radius (i.e. as small as 1.2Å or less) than that of any of the main elements locates in the interstices between the larger main elements, so that the recording material constitutes an interstitial compound.

Because of the above composition of the recording material, the C/N ratio of the recording medium and the erasability thereof in the overwriting operation can be improved.

For more improvement of the C/N ratio and the erasability, it is preferable that the relationships of $9 \leq \alpha \leq 12$, $9 \leq \beta \leq 12$, $19 \leq \gamma \leq 4$, $48 \leq \delta \leq 55$, and $0.5 \leq x \leq 3$ be satisfied in the above formula.

In such an interstitial compound as the recording material for the recording layer 3, because the atomic radius of the additional element represented by M in the above-mentioned formula is as small as 1.2 Å or less and the additional element locates in the interstices between the larger main elements to form a interstitial compound, the movement and segregation of each element scarcely take place in the recording material even after the repetition of recording and erasing operations. As a result, the overwriting repetition properties can be improved.

Figure 2:
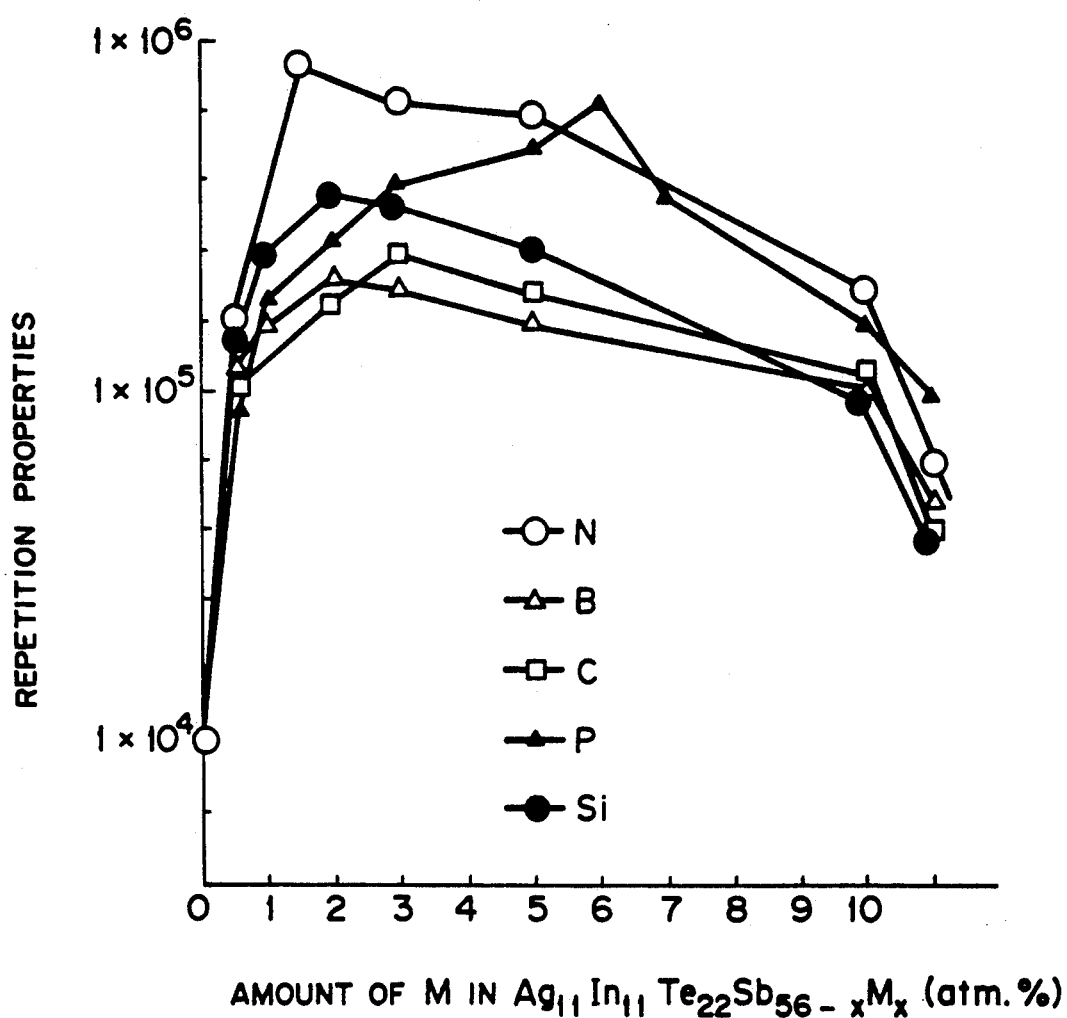
FIG. 2 is a graph showing the relationship between the amount of the additional element represented by M in the recording material in a recording layer of a phase-change type information recording medium of the present invention, and the repetition properties of the recording medium.

When the amount of the additional element M is within the range of from 0.5 to 10 atm.%, the above-mentioned overwriting repetition properties can be improved as shown in the graph shown in FIG. 2.

It is preferable that the thickness of the recording layer 3 be 200 to 1000 Å.

Materials with superior light-transmitting properties, and high resistance to heat, weather and chemicals are appropriate for the substrate 1. For instance, a sheet of glass and a film of plastics such as polycarbonate and amorphous polyolefin are preferable. Guide grooves and pits can be easily formed on the aforementioned materials by 2P (photo polymerization) method or by injection molding at a relatively low cost. When a glass substrate is employed, grooves for tracking and pits can be formed thereon by dry etching in accordance with the close contact exposure method.

The lower protective layer 2 is provided to prevent or inhibit the corrosion of the recording layer 3, which is caused by the moisture or water in the ambient atmosphere. Therefore, alloys such as SiN, SiZrN and AlN with passivation effect can be used for the lower protective layer 2. It is preferable that the thickness of the lower protective layer 2 be 600 to 2000 Å.

The upper protective layer 4 is also provided to prevent or inhibit the corrosion of the recording layer 3. Such an alloy as SiN, SiZrN or AlN, which has a sufficient passivation effect, can be used for the upper protective layer 4. It is preferable that the thickness of the upper protective layer 4 be about 300 to 1200 Å.

The heat dissipation layer 5 is provided to prevent the heat diffusion in the upper protective layer 4. By the application of a laser beam to the recording medium, heat is generated in the recording layer 3 and is transferred to the upper protective layer 4 having a small thermal conductivity. Subsequently, the transferred heat readily passes through the heat dissipation layer 5. Because of the presence of the heat dissipation layer 5, the heat diffusion in the upper protective layer 4 can be prevented. Thus, the thermal energy can be accumulated in the recording layer 3 very efficiently. This shortens the length of a recording bit, and makes the shape of the recording bit sharp, so that high-speed recording with high recording density can be carried out.

In view of the above-mentioned conditions, metals having a thermal conductivity larger than that of the material for use in the upper protective layer 4, for example, Au, Ag, Al, and alloys thereof, are preferably used for the heat dissipation layer 5. The heat dissipation layer 5 can be formed by sputtering or vacuum-deposition of the above-mentioned metals or alloys thereof. It is preferable that the thickness of the heat dissipation layer 5 be in the range of 300 to 1500 Å.

The organic protective layer 6 is provided to prevent or inhibit the oxidation and corrosion of the layers provided thereunder and to protect those layers from being damaged.

Ultraviolet-curing resins, thermoplastic resins, and hot-melt resins can be used as the material for the organic protective layer 6. It is preferable that the thickness of the organic protective layer 6 be in the range of about 1 to 5 μm.

Other features of this invention will become apparent in the course of the following description of exemplary embodiments, which are given for illustration of the invention and are not intended to be limiting thereof.

EXAMPLES 1 TO 5 AND COMPARATIVE EXAMPLE 1

On a polycarbonate substrate, a lower protective layer consisting of SiN, a recording layer with the composition shown in Table 1, an upper protective layer comprising SiN, a heat dissipation layer comprising Au, Ag or Al were successively overlaid by the sputtering method. Thereafter, a commercially available ultraviolet-curing epoxy resin "SD-301" (Trademark), made by Dainippon Ink & Chemicals, Incorporated, was applied to the above provided heat dissipation layer, using a spinner, so that an organic protective layer with a thickness of 4 μm was formed on the heat dissipation layer.

In addition, an antistatic layer of a transparent electroconductive film comprising a material shown in Table 1 was formed on the back side of the polycarbonate substrate, opposite to the lower protective layer with respect to the substrate, by the sputtering method. Thus, phase-change type information recording media according to the present invention and a comparative phase-change type information recording medium were prepared. The material and thickness of each of the lower protective layer, the recording layer, the upper protective layer, the heat dissipation layer and the antistatic layer are shown in Table 1.

TABLE 1

| | Antistatic Layer | Recording Layer | Lower Protective Layer | Upper Protective Layer | Heat Dissipation Layer |
|---|---|---|---|---|---|
| Ex. 1 | UV-curing epoxy resin (4 μm) | $Ag_{11}In_{11}Te_{22}Sb_{54}B_2$ (300 Å) | SiN (2000 Å) | SiN (500 Å) | Al (500 Å) |
| Ex. 2 | Same as above | $Ag_{11}In_{11}Te_{22}Sb_{54.5}N_{1.5}$ (320 Å) | SiN (1800 Å) | SiN (400 Å) | Ag (400 Å) |
| Ex. 3 | SiO/ITO/SiO$_2$ (0.3 μm) | $Ag_{11}In_{11}Te_{22}Sb_{53}C_3$ (300 Å) | SiN (1800 Å) | SiN (300 Å) | Al (500 Å) |
| Ex. 4 | UV-curing acrylic resin (4 μm) | $Ag_{11}In_{11}Te_{22}Sb_{50}P_6$ (350 Å) | SiN (2000 Å) | SiN (500 Å) | Al (400 Å) |
| Ex. 5 | Same as above | $Ag_{11}In_{11}Te_{22}Sb_{54}Si_2$ (310 Å) | SiN (1800 Å) | SiN (400 Å) | Au (600 Å) |
| Comp. Ex. 1 | UV-curing epoxy resin (4 μm) | $Ag_{11}In_{11}Te_{22}Sb_{56}$ (300 Å) | SiN (2000 Å) | SiN (500 Å) | Al (500 Å) |

NOTE:
The value in each parenthesis indicates the thickness of each layer.

The overwriting repetition properties of each of the above prepared phase-change type information recording media were evaluated. To initialize each recording medium, the recording medium was rotated at a linear speed of 7 m/sec under the continuous application of DC light with an intensity of 10 mW. Then, the recording of information was carried out by alternately applying a DC light with a duty of 2.6 MHz (duty ratio: 33%) and a DC light with a duty of 1.0 MHz (duty ratio: 12.5%), while the recording medium was rotated at a linear speed of 7 m/sec. The C/N ratio and the erasability were measured every 1000 revolutions of the recording medium. The overwriting repetition properties were determined by the number of revolutions at which both the C/N ratio and the erasability were decreased by 3 dB. The results are shown in Table 2.

TABLE 2

| | Composition of Recording Layer | Repetition Properties (Unit: revolutions) |
|---|---|---|
| Example 1 | $Ag_{11}In_{11}Te_{22}Sb_{54}B_2$ | $3.2 \times 10^5$ |
| Example 2 | $Ag_{11}In_{11}Te_{22}Sb_{54.5}N_{1.5}$ | $9.3 \times 10^5$ |
| Example 3 | $Ag_{11}In_{11}Te_{22}Sb_{53}C_3$ | $4.0 \times 10^5$ |
| Example 4 | $Ag_{11}In_{11}Te_{22}Sb_{50}P_6$ | $8.5 \times 10^5$ |
| Example 5 | $Ag_{11}In_{11}Te_{22}Sb_{54}Si_2$ | $7.0 \times 10^5$ |
| Comparative Example 1 | $Ag_{11}In_{11}Te_{22}Sb_{56}$ | $1.0 \times 10^4$ |

As can be seen from the results in Table 2, the overwriting repetition properties of the phase-change type information recording medium according to the present invention do not deteriorate after 100,000 revolutions. This is because the phase-change type information recording medium of the present invention comprises a recording layer comprising an interstitial compound in which an additional element having a smaller atomic radius locates in the interstices between the larger main elements of the interstitial compound. Due to the structure of the interstitial compound, the movement and segregation of the elements in the alloy are minimized, whereby the overwriting repetition properties of the phase-change type information recording medium according to the present invention are significantly improved.

What is claimed is:
1. A phase-change type information recording medium comprising a substrate and a recording layer formed thereon, comprising a recording material with the composition thereof in terms of atomic percentage being represented by general formula:

$$Ag_\alpha In_\beta Te_\gamma Sb_\delta + M_x$$

wherein $5 \leq \alpha \leq 17$, $6 \leq \beta \leq 18$, $13 \leq \gamma \leq 36$, $33 \leq \delta \leq 77$, $0.5 \leq x \leq 10$, $\alpha + \beta + \gamma + \delta + x = 100$, and M is one additional element selected from the group consisting of B, N, C, P and Si.

2. The phase-change type information recording medium as claimed in claim 1, wherein said additional element represented by M has a radius of 1.2 Å or less.

3. The phase-change type information recording medium as claimed in claim 1, wherein the thickness of said recording layer is in the range of 200 to 1000 Å.

4. The phase-change type information recording medium as claimed in claim 1, further comprising a protective layer provided between said substrate and said recording layer.

5. The phase-change type information recording medium as claimed in claim 1, further comprising a protective layer provided on said recording layer.

6. The phase-change type information recording medium as claimed in claim 1, further comprising a lower protective layer between said substrate and said recording layer, an upper protective layer on said recording layer, an upper protective layer on said upper protective layer, and an organic protective layer on said upper protective layer.

7. The phase-change type information recording medium as claimed in claim 6, further comprising an antistatic layer provided on the back side of said substrate, opposite to said lower protective layer with respect to said substrate.

* * * * *